United States Patent
Kok et al.

(10) Patent No.: US 7,038,427 B2
(45) Date of Patent: May 2, 2006

(54) METHOD FOR SUPPLYING POWER IN AN ELECTRICAL POWER SUPPLY SYSTEM HAVING A SUPERCAPACITOR

(75) Inventors: Daniel Kok, Klimmen (NL); Engbert Spijker, Nuth (NL); Lutz Gaedt, Baesweiler (NL)

(73) Assignee: Ford Global Technologies, LLC, Dearborn, MI (US)

( * ) Notice: Subject to any disclaimer, the term of this patent is extended or adjusted under 35 U.S.C. 154(b) by 300 days.

(21) Appl. No.: 10/674,935

(22) Filed: Sep. 30, 2003

(65) Prior Publication Data

US 2004/0124811 A1 Jul. 1, 2004

(30) Foreign Application Priority Data

Sep. 30, 2002 (EP) ................... 02102398

(51) Int. Cl.
*H02J 7/00* (2006.01)

(52) U.S. Cl. ........................ 320/167

(58) Field of Classification Search ........... 320/167, 320/104, 103; 307/10.1, 9.1; 323/222; 429/12
See application file for complete search history.

(56) References Cited

U.S. PATENT DOCUMENTS

| | | | | |
|---|---|---|---|---|
| 5,977,744 A | * | 11/1999 | Williams et al. | 320/104 |
| 6,271,642 B1 | * | 8/2001 | Dougherty et al. | 320/104 |
| 6,275,001 B1 | * | 8/2001 | Dierker | 320/103 |
| 6,320,358 B1 | * | 11/2001 | Miller | 323/222 |
| 6,926,978 B1 | * | 8/2005 | Graage | 429/12 |

FOREIGN PATENT DOCUMENTS

| | | | |
|---|---|---|---|
| DE | 199 15 973 | | 11/2000 |
| EP | 753925 | * | 1/1997 |
| EP | 0 865 142 | | 9/1998 |
| EP | 1 013 506 | | 6/2000 |
| EP | 0 412 631 | | 5/2001 |
| FR | 2 751 145 | | 1/1998 |

* cited by examiner

*Primary Examiner*—Pia Tibbits
(74) *Attorney, Agent, or Firm*—David B. Kelley

(57) ABSTRACT

The invention relates to a regulation system for voltage regulation in the electrical power supply system for a motor vehicle, which contains a supercapacitor. In a short-term standby mode (ST), the voltage (U) of the supercapacitor is regulated such that a voltage window ($\Delta U$) is maintained, thus ensuring a minimum energy content in the supercapacitor (4). During a long-term standby mode (LT), the supercapacitor (4) is charged to a voltage ($U_h$) only when an activation signal ($t_A$) occurs. The energy for charging is drawn from a second energy store, in particular a battery.

10 Claims, 2 Drawing Sheets

METHOD FOR SUPPLYING POWER IN AN ELECTRICAL POWER SUPPLY SYSTEM HAVING A SUPERCAPACITOR

TECHNICAL FIELD

The invention relates to a method for voltage regulation in the electrical power supply system of a motor vehicle, which contains a supercapacitor, and to an electrical power supply system that is designed for carrying out this method.

BACKGROUND

New technologies have made it possible to produce what are referred to as supercapacitors, which differ from conventional capacitors by having a high power density of, typically, 1–3 kWh/kg, a high cycling capability and a high degree of mechanical robustness. This opens up numerous options for use in the field of motor vehicle technology, and supercapacitors such as these may even be used as short-term stores for electrically powered vehicles.

In comparison to electrochemical energy stores, supercapacitors have the disadvantage of their relatively low energy content, which depends to a major extent on the output voltage of the supercapacitor. During operation in a standby mode, self-discharge also takes place, with the supercapacitor being slowly discharged through loads when the motor vehicle engine is switched off or through supercapacitor compensation circuits. When the output voltage falls below a specific limit, this can have a considerable adverse effect on the performance capability and on the behavior of the supercapacitor in the standby mode, or the capacitor may fail entirely.

Against this background, the object of the present invention was to provide voltage regulation in the electrical power supply system of a motor vehicle having a supercapacitor, which voltage regulation ensures that the supercapacitor has a long life and operates reliably in the standby mode.

SUMMARY OF THE INVENTION

The method according to the invention for voltage regulation in the electrical power supply system of a motor vehicle, which contains a supercapacitor, is distinguished in that in a short-term standby mode, the energy supply for the supercapacitor is refreshed as required in order to maintain a minimum energy supply in the supercapacitor. The expression "short-term" standby mode in this context means that this mode can be distinguished from a second standby mode, which will be explained later.

The standby mode for the supercapacitor generally occurs when the motor vehicle is stationary and the internal combustion engine is switched off. In a standby mode such as this, occasional refreshing of the energy supply for the supercapacitor ensures that the supercapacitor has a minimum energy content so that, where necessary, for example when the motor vehicle is started once again, this supercapacitor can provide sufficient electrical energy to the connected loads. Loads with a highly varying power demand, which in some circumstances is very high—such as the starter motor—can in this way be supplied adequately from the supercapacitor at any time. The battery that is normally provided in the electrical power supply system and whose life is greatly reduced by high dynamic loads can thus be protected.

According to one preferred refinement of the method, in the short-term standby mode, the energy supply for the supercapacitor is refreshed when the voltage across the supercapacitor falls below a minimum value. This procedure makes use of the fact that the energy supply in a supercapacitor is related by the laws of physics to its output voltage. Voltage monitoring, which can be carried out comparatively easily, is thus sufficient to determine the times at which it is necessary to refresh the supercapacitor.

As already mentioned, the method can be developed by the introduction of a further, so-called "long-term" standby mode. In the long-term standby mode, the energy supply for the supercapacitor is refreshed (only) as a reaction to an activation signal, with the refreshing process producing a minimum energy supply in the supercapacitor. The magnitude of this minimum energy supply is preferably the same as that in the short-term standby mode. However, in contrast to the situation in the short-term standby mode, the aim is not to maintain the minimum energy supply continuously and, instead, the energy which is stored in the supercapacitor may be considerably lower before the activation signal, possible even down to zero. The long-term standby mode is thus particularly suitable for ensuring that the supercapacitor has a longer life when the motor vehicle has been stopped for a relatively long period, which long life increases as it is discharged, while at the same time ensuring that the motor vehicle can be started up quickly.

According to one preferred refinement of the method explained above, the activation signal can be triggered at periodic times, that is to say in each case after a fixed predetermined time period. Additionally or alternatively, the activation signal can also be triggered after detection of a predetermined event. An event such as this may in particular be the opening of a door of the motor vehicle, which is generally an indication that the motor vehicle is about to be started up. Furthermore, the activation signal may, for example, also be triggered by the opening of a garage door or the insertion of the ignition key into the ignition lock. These signals make it possible to allow the motor vehicle to be started up relatively quickly once again, by using the supercapacitor, even after the motor vehicle has been stopped for a lengthy time.

According to one preferred refinement of the method, a process of refreshing the energy supply for the supercapacitor in the short-term standby mode and/or in the long-term standby mode is ended when the voltage across the supercapacitor exceeds a predetermined maximum value. This maximum value is preferably defined as a function of the type of supercapacitor such that the energy content associated with it in the supercapacitor is on the one hand sufficient for the desired functions of the motor vehicle, and such that, on the other hand, this is below the maximum permissible voltage for the supercapacitor, in order not to shorten its life to an excessive extent. The predetermined maximum value thus represents a compromise between functional readiness of the motor vehicle and protection of the supercapacitor.

The electrical power supply system for the motor vehicle typically also contains a (rechargeable) battery, in which a relatively large amount of energy can be stored over a relatively long time period. With an electrical power supply system such as this, the refreshing of the energy supply for the supercapacitor is preferably carried out by transferring energy from the battery to the supercapacitor.

Furthermore, at the start of the short-term standby mode and/or of the long-term standby mode, the supercapacitor can be discharged down to a predetermined discharge voltage, in which case the discharge voltage can preferably have the same value as the maximum voltage for the refreshing processes, as already mentioned above. The supercapacitor is discharged in order to lengthen the life of the capacitor by decreasing the voltage. The energy which is drawn from the supercapacitor is in this case advantageously transferred to a battery in the electrical power supply system, so that this energy is not lost.

According to one optional variant of the method, the short-term standby mode changes to the long-term standby mode a predetermined time period after it starts. The time period which has been mentioned may in this case be defined within a wide range, typically between one minute and two months, depending on the objectives on which it is based. It is particularly preferable for the time period for the short-term standby mode to be defined to be about 24 hours, since many ways in which a motor vehicle is used are based on a daily cycle. If the motor vehicle has thus not been started up once again after 24 hours have elapsed, it is probable that the motor vehicle is not being used for a longer time, so that the long-term standby mode is preferable, in order to provide better protection for the supercapacitor.

The invention also relates to an electrical power supply system for a motor vehicle having a supercapacitor, which is distinguished by a monitoring unit which is coupled to the supercapacitor and is designed to carry out a method of the type explained above. This means that the monitoring unit is designed in particular to maintain a minimum energy supply in the supercapacitor in a short-term standby mode. This may be done in particular by monitoring the voltage across the supercapacitor, with energy being transferred from a battery to the supercapacitor when its voltage falls below a minimum value. Furthermore, the monitoring unit can be designed to provide a long-term standby mode, in which the energy supply in the supercapacitor is refreshed only in response to an activation signal. The refreshing process in this case preferably ends when the voltage across the supercapacitor reaches a maximum value, in order to avoid adversely affecting its life expectancy.

In the electrical power supply system as described, loads with a high dynamic load component are preferably connected to the supercapacitor. This is because, in contrast to a battery, the supercapacitor is ideally suited for coping with such loads. Examples of loads such as these are the starter motor, an electronically assisted steering system (EPAS: Electric Power Assisted Steering), electrically assisted brakes and an electrically assisted turbocharger.

Other advantages and features of the present invention will become apparent when viewed in light of the detailed description of the preferred embodiment when taken in conjunction with the attached drawings and appended claims.

DESCRIPTION OF THE PREFERRED EMBODIMENT

Figure 1:
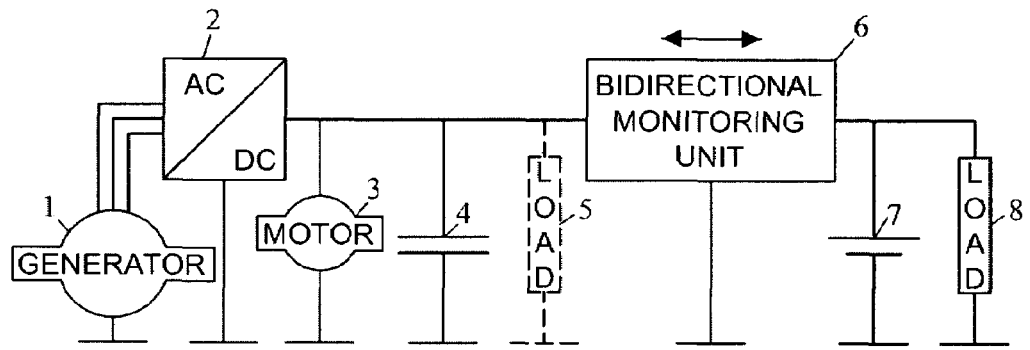
FIG. 1 shows the components of an electrical power supply system having a supercapacitor according to the present invention.

FIG. 1 shows, schematically, the electrical power supply system for a motor vehicle. The electrical energy for this electrical power supply system is provided by a generator 1 (alternator) in the form of AC voltage, which is converted to DC voltage in a rectifier 2. This DC voltage is supplied to a starter motor 3 for starting the internal combustion engine (not shown) of the motor vehicle, to a supercapacitor 4, possibly to further loads 5, and to a monitoring unit 6 having a bidirectional power electronic system. The power electronics may in this case be a DC/DC converter, pulse-width modulation, a relay or the like. The DC voltage is passed via the monitoring unit 6 to an electrochemical rechargeable battery 7 and to further loads 8.

The loads 5 which are connected to the supercapacitor 4 are preferably those with a high dynamic load component and with a high maximum load (that is to say those which have a high ratio of the peak power to the average power). Examples of this are not only the starter motor 3 but also an electrically assisted steering system, electrical brakes or an electrically assisted turbocharger. In contrast, the battery 7 preferably supplies loads 8 with a lower dynamic load component and power consumption.

The described distribution of the loads 3, 5 and 8 to the supercapacitor 4 and to the battery 7 thus has an advantageous effect on the life expectancy of the battery 7. This is because most electrochemical energy storage devices have a limited life which is governed by the energy throughput. This maximum energy throughput depends not only to a major extent on the amplitude of the charging current, but also means that charge transfer by an apparatus such as this has a certain "price". It is thus advantageous to minimize the peak load and discharge currents and the energy throughput of the battery 7, in order to reduce the costs of the system (smaller battery) and to maximize the life of this apparatus. This is done by optimizing and using the battery 7 for loads with a low power consumption over long time periods.

In contrast, the supercapacitor 4 has a very long life, a high cycling capability and low costs by producing it from low-cost materials. For this reason, the supercapacitor 4 has a very much lower "price" per unit of energy that is passed through it, so that it is advantageously used for dynamic loads with a high power consumption.

However, not only is the architecture of the electrical power supply system as illustrated in FIG. 1 optimized, but the monitoring unit 6 is also set up for optimum operation in the standby mode. A standby mode occurs in particular when the internal combustion engine of the motor vehicle has been switched off, and the generator 1 is thus not producing any energy. In this case, it is necessary to ensure that, when the motor vehicle is started once again, sufficient electrical energy is available for the loads which come into action then, in particular such as the starter motor 3. The monitoring unit 6 ensures this by means of a method in which energy is shifted as required between the supercapacitor 4 and the battery 7, as is explained in the following text with reference to FIG. 2.

Figure 2:
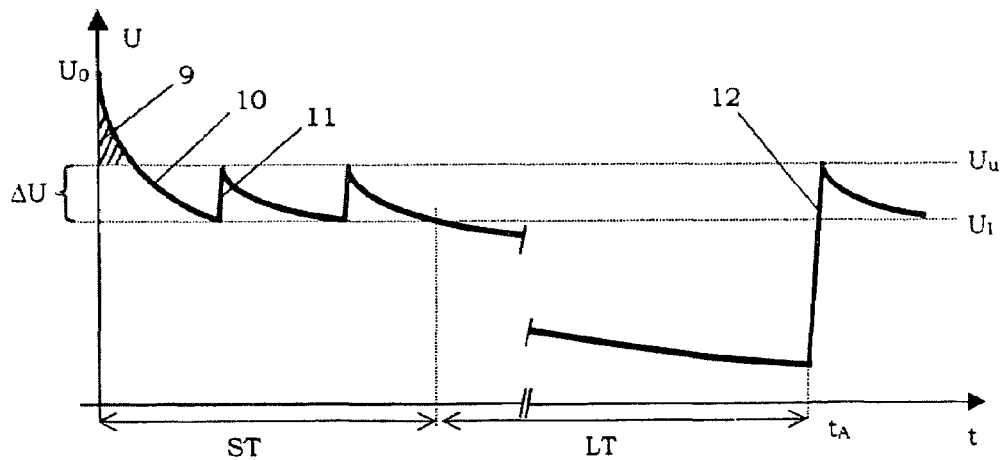
FIG. 2 shows the voltage profile across the supercapacitor during a short-term standby mode and a long-term standby mode according to the present invention.

FIG. 2 shows the output voltage U of the supercapacitor 4 plotted against the time t after switching off the internal combustion engine. The voltage, which is initially at a high voltage level $U_0$, slowly decreases along the curve 10 as a result of self-discharge, as a result of loads which are still connected when the engine is switched off, by supercapacitor compensation circuits or the like. When the voltage in this case reaches a minimum value $U_1$, this voltage is increased by the monitoring unit 6 along the curve 11 up to a maximum value $U_h$, by transferring energy from the battery 7 to the supercapacitor 4. This process is repeated as often as is necessary in the short-term standby mode ST. The monitoring unit 6 in this way keeps the voltage across the supercapacitor within a relatively narrow voltage window $\Delta U$ between $U_l$ and $U_h$ in the short-term standby mode ST.

In order to allow the described function to be carried out, the monitoring unit 6 has to monitor the voltage across the supercapacitor 4 continuously. Since the voltage represents a direct measure of the energy content of the supercapacitor 4, a strategy such as this can be used to ensure that a minimum energy supply is always maintained in the supercapacitor 4 during the short-term standby mode ST. This is in any case true for as long as the battery 7 contains sufficient energy for the continual refreshing of the supercapacitor 4.

Figure 3:
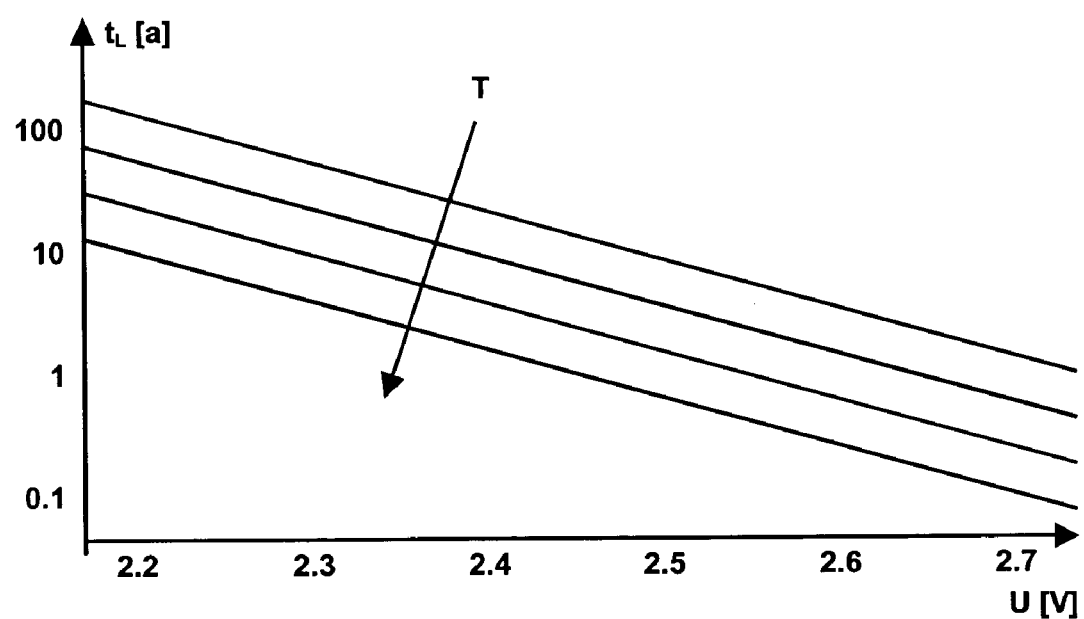
FIG. 3 shows the life expectancy of a supercapacitor as a function of its voltage and of its temperature.

The refreshing of the capacitor voltage U is ended at the maximum value $U_h$, since the life expectancy of the capacitor 4 decreases as the capacitor voltage increases. The corresponding relationship is shown in the form of a graph in FIG. 3, in which the capacitor voltage U is shown in volts on the horizontal axis, and the associated life expectancy $t_L$ is shown in years on the vertical axis. Furthermore, various curves which run parallel to one another are shown, which reflect the decrease in the life expectancy as the temperature T of the supercapacitor increases. Keeping the voltage across the supercapacitor 4 within the described voltage window $\Delta U$ thus ensures that the capacitor is protected while, at the same time, it is possible to start the motor vehicle again in the short-term standby mode ST, at any time, with the aid of the energy from the supercapacitor 4.

However, if the motor vehicle has not been started once again within a lengthy time period, then the short-term standby mode ST changes to a long-term standby mode LT. Said time period may in this case be in the range from a few minutes to a few months.

As can be seen from FIG. 2, the supercapacitor 4 can be discharged indefinitely, in particular even completely, in the long-term standby mode LT. The capacitor voltage U is refreshed up to the maximum voltage $U_h$ only when an appropriate activation signal is passed to the monitoring unit 6 at a time $t_4$. The activation signal may, in the simplest case, be produced at regular time intervals by a clock generator. However, it is preferably an external activation signal, which is triggered remotely by the user or is produced, for example, in the event of an activity such as the opening of the doors. Opening of the doors is in this case an indication that the motor vehicle will be started up once again. The refreshing of the charge in the supercapacitor 4 in these situations optimally prepares the electrical power supply system for the renewed starting process.

Furthermore, the monitoring unit 6 can also be designed such that excess energy in the supercapacitor 4 can be transferred to the battery 7 at the start of a standby mode. This is the situation for the energy 9 illustrated by the shaded area in FIG. 2, as is produced when the original capacitor voltage $U_0$ is reduced to the maximum value $U_h$. In a similar way, at the start of the long-term standby mode LT, some of the energy or all of the energy can be transferred from the supercapacitor 4 to the battery 7 (not shown). This energy from the supercapacitor can be used to charge the battery 7 with small currents over a long time period, in order to achieve a higher battery SOC (State of Charge) (lead-acid batteries require a charging process with small currents for 6 to 24 hours depending on the SOC, in order to achieve a 100% SOC).

Furthermore, the regulation method as implemented in the monitoring unit 6 may include an algorithm which supplies loads which draw current even after the internal combustion engine has been switched off from the supercapacitor 4 during an initial phase, and later from the battery 7 (when the voltage across the supercapacitor 4 falls below a minimum voltage).

While particular embodiments of the invention have been shown and described, numerous variations and alternate embodiments will occur to those skilled in the art. Accordingly, it is intended that the invention be limited only in terms of the appended claims.

What is claimed is:

1. A method for voltage regulation in an electrical power supply system having a supercapacitor, wherein in a short-term standby mode (ST), an energy supply for the supercapacitor is refreshed as required in order to maintain a minimum energy supply in the supercapacitor.

2. The method according to claim 1, wherein the energy supply for the supercapacitor is refreshed in the short-term standby mode (ST) when a voltage across the supercapacitor has fallen below a predetermined minimum value ($U_l$).

3. The method according to claim 2, wherein in a long-term standby mode (LT), the energy supply for the supercapacitor is refreshed as a reaction to an activation signal, in order to produce a minimum energy supply in the supercapacitor.

4. The method according to claim 3, wherein the activation signal is triggered periodically in time after detection of a predetermined event, in particular the opening of a door of a motor vehicle.

5. The method according to claim 4, wherein a refreshing process for the energy supply in the short-term standby mode (ST) or in the long-term standby mode (LT) is ended when the voltage across the supercapacitor exceeds a predetermined maximum value ($U_h$).

6. The method according to claim 5, wherein the energy supply for the supercapacitor is refreshed by transferring energy from a battery in the electrical power supply system.

7. The method according to claim 6, wherein at the start of the short-term standby mode (ST) or the long-term standby mode (LT), the supercapacitor is discharged down to a predetermined discharge voltage ($U_h$), with the energy which is withdrawn from the supercapacitor preferably being transferred to a battery in the electrical power supply system.

8. The method according to claim 7, wherein the short-term standby mode (ST) preferably changes to the long-term standby mode (LT) after a time period of one minute to two months, preferably after about 24 hours.

9. An electrical power supply system comprising a supercapacitor and a monitoring unit, which is coupled to the supercapacitor and is designed to assist with voltage regulation including the ability to enter a short-term standby mode (ST), wherein the energy supply for the supercapacitor is refreshed as needed in order to maintain a minimum energy supply in the supercapacitor.

10. The electrical power supply system according to claim 9, wherein loads having a high dynamic load component are connected to the supercapacitor.

* * * * *